United States Patent
Sun et al.

(10) Patent No.: US 8,150,133 B2
(45) Date of Patent: Apr. 3, 2012

(54) SYSTEM AND METHOD FOR AUTOMATIC REGISTRATION OF 4D (3D PLUS TIME) RENAL PERFUSION MRI DATA

(75) Inventors: Ying Sun, Singapore (SG); Gareth Funka-Lea, Cranbury, NJ (US)

(73) Assignee: Siemens Aktiengesellschaft, München (DE)

( * ) Notice: Subject to any disclaimer, the term of this patent is extended or adjusted under 35 U.S.C. 154(b) by 470 days.

(21) Appl. No.: 12/421,862

(22) Filed: Apr. 10, 2009

(65) Prior Publication Data

US 2009/0324043 A1 Dec. 31, 2009

Related U.S. Application Data

(60) Provisional application No. 61/055,184, filed on May 22, 2008.

(51) Int. Cl.
*G06K 9/00* (2006.01)

(52) U.S. Cl. ...................................................... 382/131
(58) Field of Classification Search ................... 382/131
See application file for complete search history.

(56) References Cited

U.S. PATENT DOCUMENTS

| | | | |
|---|---|---|---|
| 6,757,423 B1 * | 6/2004 | Amini | 382/154 |
| 2005/0204601 A1 | 9/2005 | Kurple et al. | |
| 2005/0240099 A1 | 10/2005 | Sun et al. | |
| 2007/0014452 A1 * | 1/2007 | Suresh et al. | 382/128 |
| 2009/0039235 A1 * | 2/2009 | MacFarlane et al. | 250/206.1 |
| 2010/0104168 A1 * | 4/2010 | Dobbe | 382/134 |

OTHER PUBLICATIONS

Zikic, et al., Automatic Alignment of Renal DCE-MRI Image Series for Improvement of Quantitative Tracer Kinetic Studies, SPIE Medical Imaging, San Diego, California, USA, Feb. 16-21, 2008.*

* cited by examiner

*Primary Examiner* — Rodney Fuller
(74) *Attorney, Agent, or Firm* — Donald B. Paschburg; F. Chau & Associates, LLC

(57) ABSTRACT

A method for registering digital renal perfusion images includes selecting a volume of interest (VOI) containing a kidney in a reference renal perfusion image, computing 3D intensity gradients for a plurality of points in the VOI of the reference renal perfusion image, computing 3D intensity gradients for a plurality of points in a search window of a current renal perfusion image, and maximizing a similarity measure between the reference image VOI and the current image search window, where the similarity measure is a function of the 3D intensity gradients computed for the reference image and the current image.

21 Claims, 3 Drawing Sheets

(a) Bounding box in the X-Y plane  (b) Bounding box in the X-Z plane

SYSTEM AND METHOD FOR AUTOMATIC REGISTRATION OF 4D (3D PLUS TIME) RENAL PERFUSION MRI DATA

CROSS REFERENCE TO RELATED UNITED STATES APPLICATIONS

This application claims priority from "A Fast Method for Automatic Registration of 4D (3D plus time) Renal Perfusion MRI Data", U.S. Provisional Application No. 61/055,184 of Sun, et al., filed May 22, 2008, the contents of which are herein incorporated by reference in their entirety.

TECHNICAL FIELD

This disclosure is directed to the registration of renal perfusion MR image data.

DISCUSSION OF THE RELATED ART

In physiology, perfusion is the process of nutritive delivery of arterial blood to a capillary bed in biological tissue. Perfusion scanning is the process by which this perfusion can be observed, recorded and quantified. Being able to observe and quantify perfusion in the human body has been an invaluable step forward in medicine. With the ability to ascertain data on the blood flow to vital organs such as the heart and the brain, physicians can make quicker and more accurate choices on treatment for patients. Perfusion scanning encompasses a wide range of medical imaging modalities, such as computed tomography (CT) and magnetic resonance imaging (MRI). There are several different techniques of detecting perfusion parameters with the use of MRI, the most common being dynamic susceptibility contrast imaging (DSC-MRI) and arterial spin labeling (ASL). The acquired data are then postprocessed to obtain perfusion maps with different parameters, such as BV (blood volume), BF (blood flow), MTT (mean transit time) and TTP (time to peak).

Magnetic resonance imaging (MRI) has been used for the assessment of renal perfusion. In renal perfusion MRI, the abdomen is scanned rapidly and repeatedly following a bolus injection of a contrast agent. The kinematics of the contrast agent are reflected in the intensity changes of the obtained time series of MR images. Analysis of the dynamic behavior of the signal intensity can provide valuable functional information.

However, perfusion MR image sequences suffer from motion induced by patient breathing during acquisition. Therefore, registration should be performed on time-series images to ensure the correspondence of anatomical structures in different frames. Due to the vast amounts of data acquired in perfusion MRI studies, automatic registration is strongly desirable The registration of time-series images is a challenging task because the appearance of the kidney changes rapidly over the course of contrast enhancement. Standard block matching techniques fail because the intensity at the same physical location changes across the MR image sequence due to the wash-in and wash-out of the contrast agent. In addition, different renal tissue types do not enhance uniformly, which results in a rapidly changing image contrast. It is also computationally challenging to deal with volumetric data sets.

There has been limited work on the registration of renal perfusion MR images. Current methods all require manually drawn kidney contours in one time frame to obtain a mask or a model, which can then be used to propagate the contours to other frames in the image sequence. However, there are no automated image registration algorithms to correct the motion induced by patient breathing for renal perfusion MR images.

SUMMARY OF THE INVENTION

Exemplary embodiments of the invention as described herein generally include methods and systems for the registration of renal perfusion MR image data, to establish the appropriate correspondence between every voxel in the region of interest in each volume of the sequence, in a fast and efficient manner.

According to an aspect of the invention, there is provided a method for registering digital renal perfusion images, the method including selecting a volume of interest (VOI) containing a kidney in a reference renal perfusion image, computing 3D intensity gradients for a plurality of points in the VOI of the reference renal perfusion image, computing 3D intensity gradients for a plurality of points in a search window of a current renal perfusion image, and maximizing a similarity measure between the reference image VOI and the current image search window, where the similarity measure is a function of the 3D intensity gradients computed for the reference image and the current image.

According to a further aspect of the invention, the volume of interest in the reference image is selected by two 2D bounding boxes in perpendicular planes.

According to a further aspect of the invention, registration is determined by translational displacement of the current image with respect to the reference image.

According to a further aspect of the invention, parameters associated with a maximal similarity measure determine the translational displacement of each point in the VOI of the reference image to a corresponding point in the current image.

According to a further aspect of the invention, maximizing the similarity measure between the reference image VOI and the current image search window comprises calculating the similarity measure for a plurality of translational displacements (dx,dy,dz) from points in the reference VOI to points in the current image search window, and selecting a displacement (dx*, dy*, dz*) that maximizes the similarity measure.

According to a further aspect of the invention, the similarity measure is defined as $$S(dx, dy, dz) = \sum_{(x,y,z) \in V} w(x, y, z; dx, dy, dz) |v_r(x, y, z)^T v_c(x + dx, y + dy, z + dz)|,$$

where w(x,y,z;dx,dy,dz) is defined by $$w(x, y, z; dx, dy, dz) = \frac{M_r(x, y, z) M_c(x + dx, y + dy, z + dz)}{\sum_{(x,y,z) \in V} M_r(x, y, z) M_c(x + dx, y + dy, z + dz)},$$

where $$M_r(x, y, z) = \sqrt{\left(\frac{\partial I_r(x, y, z)}{\partial x}\right)^2 + \left(\frac{\partial I_r(x, y, z)}{\partial y}\right)^2 + \left(\frac{\partial I_r(x, y, z)}{\partial z}\right)^2}$$

is a magnitude of the 3D intensity gradients $$\frac{\partial I_r(x, y, z)}{\partial x}, \frac{\partial I_r(x, y, z)}{\partial y}, \frac{\partial I_r(x, y, z)}{\partial z}$$

of the reference image VOI $I_r$, and $$v_r(x, y, z) = \frac{1}{M_r(x, y, z)} \left[ \frac{\partial I_r(x, y, z)}{\partial x}, \frac{\partial I_r(x, y, z)}{\partial y}, \frac{\partial I_r(x, y, z)}{\partial z} \right]^T$$

is a unit orientation vector of the gradient, and where the sum is over all points in the VOI.

According to a further aspect of the invention, the method further comprises restricting the sum to a subset of the VOI comprising those points whose intensity gradient magnitudes are above a threshold.

According to a further aspect of the invention, the threshold is set to select about 15% of the points in the VOI.

According to a further aspect of the invention, the current image search window is determined based on a location of the kidney in the reference image VOI and its maximum possible displacements.

According to another aspect of the invention, there is provided a program storage device readable by a computer, tangibly embodying a program of instructions executable by the computer to perform the method steps for registering digital renal perfusion images.

DETAILED DESCRIPTION OF EXEMPLARY EMBODIMENTS

Figure 1:
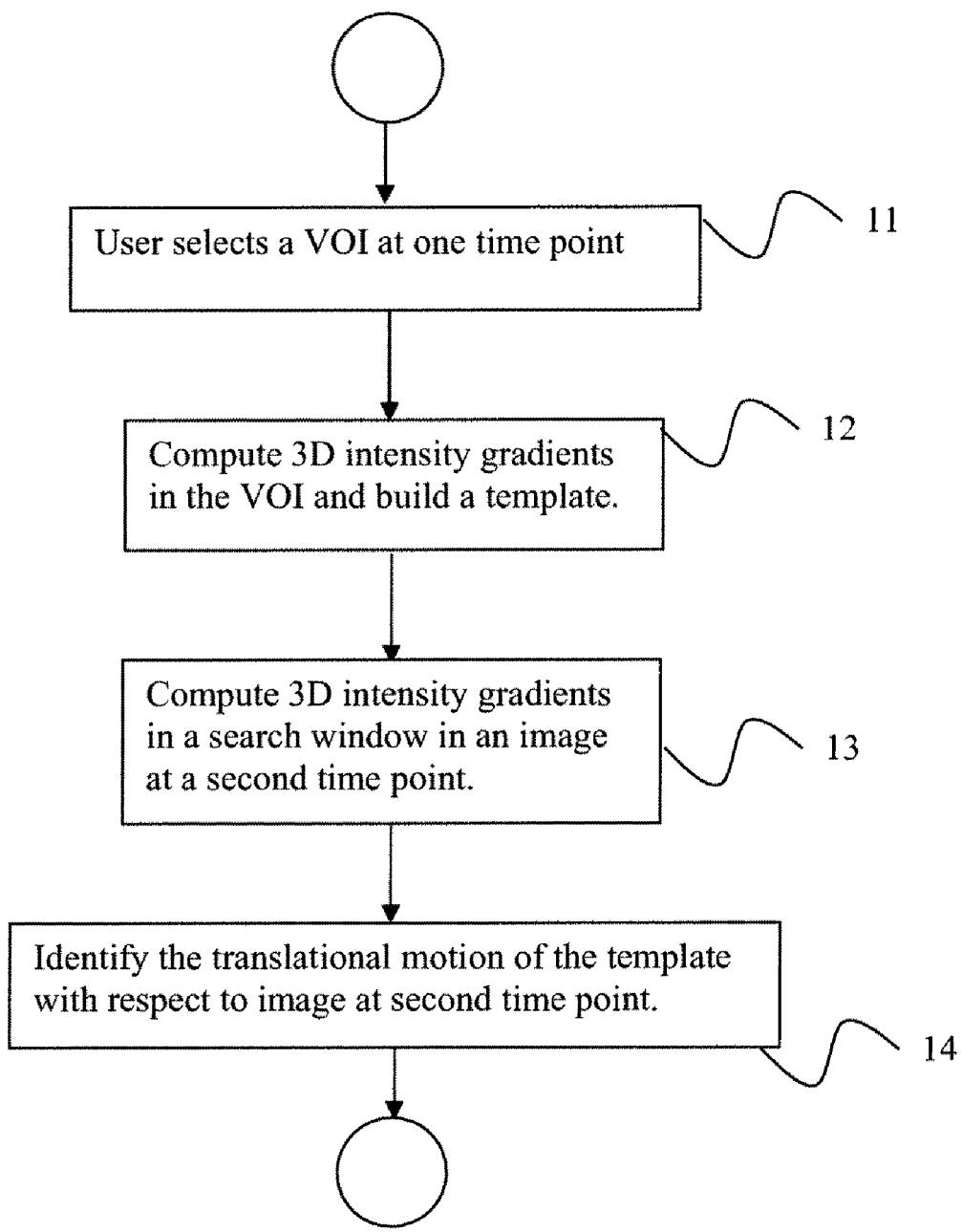
FIG. 1 is a flowchart of a method for registering renal perfusion MR image datasets, according to an embodiment of the invention.

Exemplary embodiments of the invention as described herein generally include systems and methods for registering renal perfusion MR image datasets. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, ad alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

In renal perfusion MRI, since a kidney seldom undergoes significant elastic deformation or rotation, it is rather important to correct its translational motion, the dominant motion induced by breathing, prior to renal blood flow quantification. For efficiency and simplicity, it may be assumed in an embodiment of the invention that the kidney is a rigid body and the motion may be reduced to translation with integer voxel displacements. This is a reasonable assumption because translation is the dominant motion. Because the motion of the soft tissues surrounding each kidney may not be similar to the motion of the kidney, the interference from the surrounding tissues tends to degrade e accuracy of the registration. In order to minimize this interference, according to an embodiment of the invention, a user may crop a volume that contains the kidney, known as the volume of interest (VOI). Given a VOI in one frame, it is desired to find a best match in other time frames by shifting the bounding volume of the selected VOI with integer voxel offsets. According to an embodiment of the invention, a rough registration can be accomplished by template matching.

FIG. 1 is a flowchart of a method for registering renal perfusion MR image datasets, according to an embodiment of the invention. Referring to the figure, given a sequence of images, a method starts at step 11 by selecting a VOI for a sequence image at one time point, continues by building a template from the VOI at step 12, computing gradients in a search window of a current image in the sequence of images at step 13, and by identifying the displacement of the VOI with respect to sequence images at other time points at step 14.

The following steps describe the flowchart of the registration algorithm of FIG. 1 in more detail.

Figure 2:
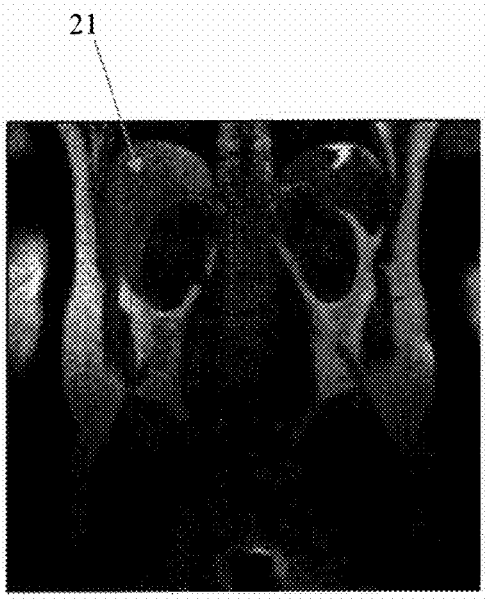
FIG. 2 illustrates how a VOI is manually defined by a user, according to an embodiment of the invention.
Figure 2:
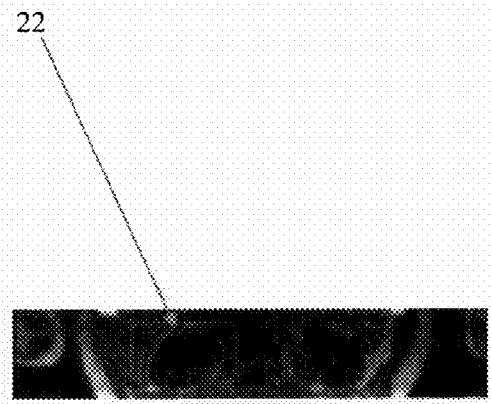

1. A user selects a VOI by cropping a sub-volume that contains a kidney at one time point. FIG. 2 illustrates how the VOI can be manually defined by the user with two rectangular bounding boxes: one 21 in the X-Y plane and the other 22 in the X-Z plane. Note that this choice of bounding boxes is exemplary and non-limiting, and any appropriate pair of rectangular bounding boxes in perpendicular planes can be used to select the VOI. Note that these 2D bounding boxes need not be rectangular, and that the 3D VOI need not be rectangular, and that any closed shape around a kidney or region of interest can serve as a VOI in an embodiment of the invention.

2. 3D intensity gradients are computed for each voxel in the VOI, and are used to build a template.

3. 3D intensity gradients are computed for selected points in a renal image at a second time point.

4. The translational motion of the VOI at the second time point is determined by searching for a 3D displacement that maximizes a similarity measure between the image volume at the second time point in the image sequence and the template. This can be repeated for all images in the sequence of images to yield the translational motion of the VOI at each time point.

Given the VOI at one time point, an algorithm according to an embodiment of the invention can find the best match to the cropped VOI at other time points. At this stage, according to an embodiment of the invention, it is assumed that the motion is reduced to translation. For registration of 2D renal perfusion MR images, template matching has been found to be a simple and efficient way to track a region of interest. For 2D registration, the orientations of the edges along tissue boundaries are always substantially parallel across the time points, despite the fact that the relative intensities between tissues vary with time. As this observation still holds for the 3D case, a 2D registration algorithm can be extended to 3D by choosing a template defined by 3D intensity gradients.

For template matching, it is important to extract the right features to build the template. Generally two channels of information are used, the intensity and the local gradient. In this case, the intensity changes rapidly and one does not know exactly which intensity level the template should assume. Here, image features invariant to rapid intensity and contrast changes are used. Although the relative intensities between tissues vary with time, it is observed that the orientations of the edges along tissue boundaries are always parallel across the image sequence. Thus, the template defined by the orientation of the image gradient is chosen.

In a formulation according to an embodiment of the invention, the manually cropped VOI is known as the reference volume. Let $(x_l^r, y_l^r, z_l^r)$ be the position of the $l^{th}$ voxel inside the VOI. Let $v_l^r$ and $M_l^r$ stand for respectively the direction and magnitude of the image gradient at the corresponding voxel in the reference image. One may obtain $v_l^r$ and $M_l^r$ using any edge detector as known in the art. Let $P=\{1, 2, \ldots, L\}$ denote the set of indices of all the voxels inside the VOI, then the template may be represented by a set of five tuples $\{(x_l^r, y_l^r, z_l^r, v_l^r, M_l^r) | l \in P\}$.

Let $$\frac{\partial I_r(x, y, z)}{\partial x}, \frac{\partial I_r(x, y, z)}{\partial y}, \text{ and } \frac{\partial I_r(x, y, z)}{\partial z}$$

represent, respectively, the derivative of the image intensity $I_r$ along the x, y, and z directions at voxel (x,y,z) in the reference volume. According to an embodiment of the invention, the partial derivatives can be obtained using 3D Gaussian kernel, for example, $$\frac{\partial I_r(x, y, z)}{\partial x} = \left[\frac{\partial}{\partial x} G_\sigma(x, y, z)\right] * I_r(x, y, z) \qquad (1)$$
$$= [g'_\sigma(x) h_\sigma(y) h_\sigma(z)] * I_r(x, y, z),$$

where $$h_\sigma(x) = e^{-\frac{x^2}{2\sigma^2}} \text{ and } g'_\sigma(x) = \frac{1}{\sqrt{2\pi} \sigma} \left(-\frac{x}{\sigma^2}\right) h_\sigma(x). \qquad (2)$$

Let $$M_r(x, y, z) = \sqrt{\left(\frac{\partial I_r(x, y, z)}{\partial x}\right)^2 + \left(\frac{\partial I_r(x, y, z)}{\partial y}\right)^2 + \left(\frac{\partial I_r(x, y, z)}{\partial z}\right)^2} \qquad (3)$$

represent the magnitude of the 3D gradients of the reference volume, and the unit vector $$v_r(x, y, z) = \frac{1}{M_r(x, y, z)} \left[\frac{\partial I_r(x, y, z)}{\partial x}, \frac{\partial I_r(x, y, z)}{\partial y}, \frac{\partial I_r(x, y, z)}{\partial z}\right]^T \qquad (4)$$

the orientation of the gradients.

Let $V=\{(x,y,z)\}$ denote the set of voxels in the VOI. Let $M_c(x,y,z)$ and $v_c(x,y,z)$ denote respectively the magnitude and the orientation of the gradient at voxel (x,y,z) in the current volume. For each displacement (dx,dy,dz), an edge-based measure according to an embodiment of the invention to quantify the similarity between the current volume and the reference volume may be defined as:

$$S(dx, dy, dz) = \qquad (5)$$
$$\sum_{(x,y,z) \in V} w(x, y, z; dx, dy, dz) |v_r(x, y, z)^T v_c(x+dx, y+dy, z+dz)|,$$

where the weight is defined by $$w(x, y, z; dx, dy, dz) = \frac{M_r(x, y, z) M_c(x+dx, y+dy, z+dz)}{\sum_{(x,y,z) \in V} M_r(x, y, z) M_c(x+dx, y+dy, z+dz)}. \qquad (6)$$

Note that $S(dx,dy,dz)$, $0 \leq S(dx,dy,dz) \leq 1$, is the normalized average of the absolute projection value between two vectors $v_c(x+dx,y+dy,z+dz)$ and $v_r(x,y,z)$ over the entire VOI. Using the absolute value of the projection, a similarity measure according to an embodiment of the invention naturally handles contrast inversions that commonly occur in renal perfusion studies, especially before and after the wash-in of the contrast agent. In addition, by using the normalized product of the gradient magnitudes as the weight, the similarity measure favors strong gradients whose orientations are consistent with those of the stronger edges in the reference VOI. A similarity measure according to an embodiment of the invention is invariant to rapidly changing image contrast, in the sense that its value is insensitive to changes in the contrast as long as the edge orientations are nearly parallel to those of the template.

Since the location of the kidney is confined to a certain range, one only needs to compute $S(dx,dy,dz)$ within a searching window. The integer displacement $(dx^*,dy^*,dz^*)$ that achieves the maximum S is determined by exploring all possible solutions $(dx,dy,dz)$ over a reasonable search window. The size of the search window can be determined by the size of the reference VOI and a maximum possible translational displacement of the kidney. Note that the value of $S(dx^*,dy^*,dz^*)$ is also a good indication of the confidence level of the resulting displacement.

In practice, it is not cost-efficient to consider every voxel in the reference VOI because the majority of the voxels have a very weak gradient magnitude, and hence do not substantially affect the value of the similarity measure. Therefore, it is possible to reduce the computational cost without degrading the registration accuracy, by ignoring those voxels with a weak gradient magnitude while only keeping salient voxels with a stronger gradient magnitude.

Let $V_1$ be a subset of the reference set V such that the gradient magnitude of any voxel in $V_1$ is greater than a threshold T, i.e., $V_1=\{(x,y,z) | M_r(x,y,z) > T, (x,y,z) \in V\}$. The threshold is chosen such that only a small percentage p of the voxels in the VOI are in the set $V_1$, e.g., p=15% according to an embodiment of the invention. This subset of points, with their associated gradient magnitudes and orientations, can serve as a template. To further speed up a registration algorithm according to an embodiment of the invention, it may be assumed that the gradient magnitude $M_r(x,y,z)$ is nearly the same for all the voxels in the set $V_1$, i.e., $M_r(x_1,y_1,z_1) \cong M_r(x_2, y_2,z_2)$, $\forall (x_1,y_1,z_1) \in V_1$ and $(x_2,y_2,z_2) \in V_1$. The weight $w(x,y,z;dx,dy,dz)$ is then reduced to $$\tilde{w}(x, y, z; dx, dy, dz) = \frac{M_c(x + dx, y + dy, z + dz)}{\sum_{(x,y,z) \in V_1} M_c(x + dx, y + dy, z + dz)}. \quad (7)$$

Hence, the similarity measure becomes $$\tilde{S}(dx, dy, dz) = \sum_{(x,y,z) \in V_1} \tilde{w}\begin{pmatrix} x, y, z; \\ dx, dy, dz \end{pmatrix} \left| v_r(x, y, z)^T v_c \begin{pmatrix} x + dx, \\ y + dy, \\ z + dz \end{pmatrix} \right|. \quad (8)$$

In this way the number of multiplications required to compute the similarity measure over the search space is reduced by about $(1-p)$. Intuitively, the value of p according to an embodiment of the invention should not be too close to either 1 or 0, because when p is too large, an algorithm according to an embodiment of the invention can only achieve very limited speedup, and when p is too small, there will be a loss in the registration accuracy. Experimentally, it was observed that 10-20% is generally the healthy range for p based on the experiments with the data sets tested.

Thus, despite the rapidly changing image contrast and the fact that translational motion between two adjacent frames can be relatively large, an algorithm according to an embodiment of the invention can reliably track the selected VOI across the image sequence for renal perfusion studies, with minor tracking error in frames that lack strong edges.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 3:
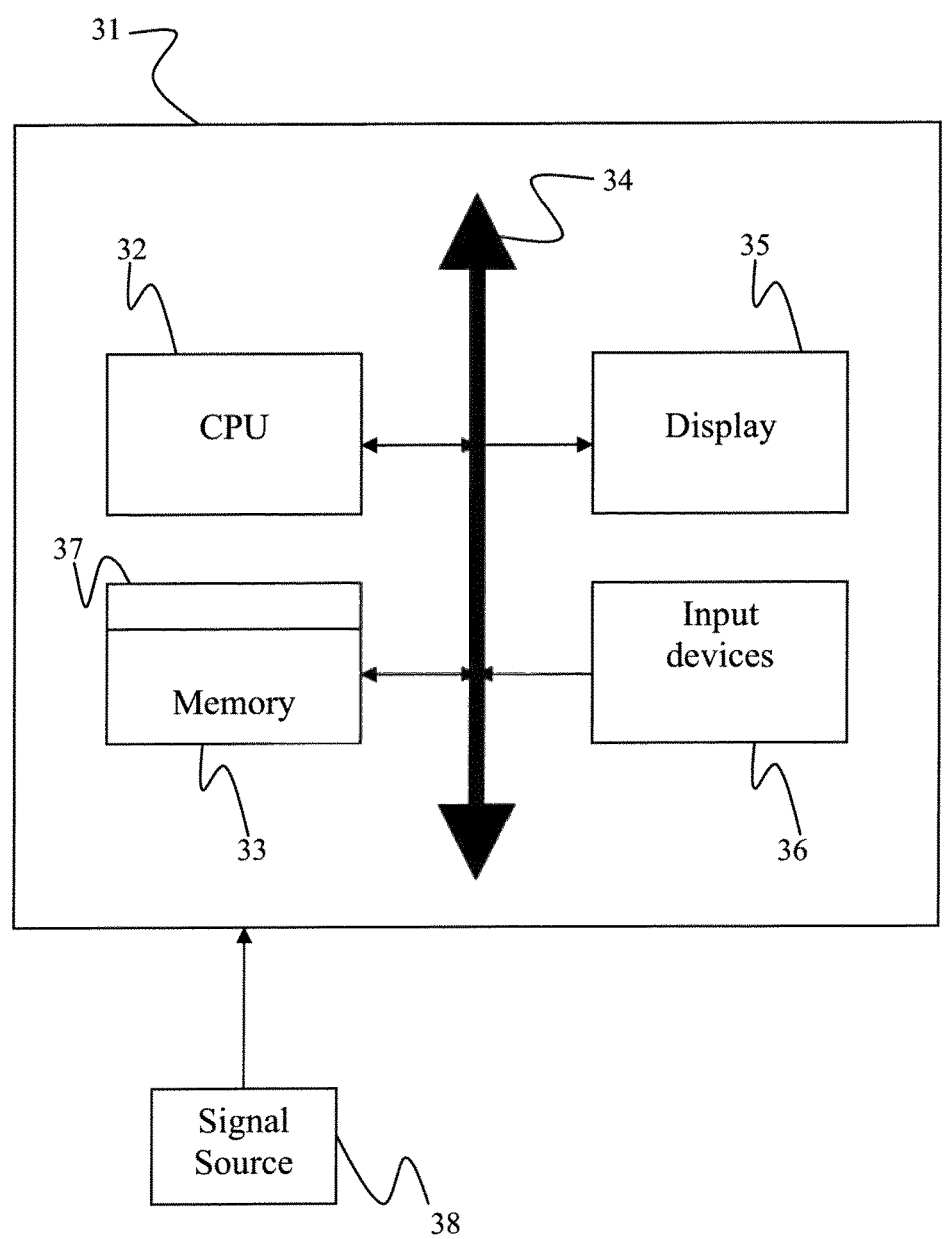
FIG. 3 is a block diagram of an exemplary computer system for implementing a method for registering renal perfusion MR image datasets, according to an embodiment of the invention.

FIG. 3 is a block diagram of an exemplary computer system for implementing a method for registering renal perfusion MR image datasets, according to an embodiment of the invention. Referring now to FIG. 3, a computer system 31 for implementing the present invention can comprise, inter alia, a central processing unit (CPU) 32, a memory 33 and an input/output (I/O) interface 34. The computer system 31 is generally coupled through the I/O interface 34 to a display 35 and various input devices 36 such as a mouse 2s and a keyboard. The support circuits can include circuits such as cache, power supplies, clock circuits, and a communication bus. The memory 33 can include random access memory (RAM), read only memory (ROM), disk drive, tape drive, etc., or a combinations thereof. The present invention can be implemented as a routine 37 that is stored in memory 33 and executed by the CPU 32 to process the signal from the signal source 38. As such, the computer system 31 is a general purpose computer system that becomes a specific purpose computer system when executing the routine 37 of the present invention.

The computer system 31 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer implemented method for registering digital renal perfusion images, the method performed by the computer comprising the steps of:
    selecting a volume of interest (VOI) containing a kidney in a reference renal perfusion image, wherein said volume of interest in said reference image is selected by two 2D bounding boxes in perpendicular planes;
    computing 3D intensity gradients for a plurality of points in said VOI of said reference renal perfusion image;
    computing 3D intensity gradients for a plurality of points in a search window of a current renal perfusion image; and
    maximizing a similarity measure between the reference image VOI and the current image search window, wherein said similarity measure is a function of said 3D intensity gradients computed for said reference image and said current image.

2. The method of claim 1, wherein registration is determined by translational displacement of the current image with respect to the reference image.

3. The method of claim 2, wherein parameters associated with a maximal similarity measure determine the translational displacement of each point in the VOI of the reference image to a corresponding point in the current image.

4. The method of claim 3, wherein maximizing the similarity measure between the reference image VOI and the current image search window comprises calculating said similarity measure for a plurality of translational displacements $(dx,dy,dz)$ from points in said reference VOI to points in said current image search window, and selecting a displacement $(dx^*,dy^*,dz^*)$ that maximizes the similarity measure.

5. The method of claim 4, wherein said similarity measure is defined as $$S(dx, dy, dz) = \sum_{(x,y,z) \in V} w\begin{pmatrix} x, y, z; \\ dx, dy, dz \end{pmatrix} \left| v_r(x, y, z)^T v_c \begin{pmatrix} x + dx, \\ y + dy, \\ z + dz \end{pmatrix} \right|,$$

wherein $w(x,y,z;dx,dy,dz)$ is defined by $$w(x, y, z; dx, dy, dz) = \frac{M_r(x, y, z)M_c(x + dx, y + dy, z + dz)}{\sum_{(x,y,z) \in V} M_r(x, y, z)M_c(x + dx, y + dy, z + dz)},$$

wherein $$M_r(x, y, z) = \sqrt{\left(\frac{\partial I_r(x, y, z)}{\partial x}\right)^2 + \left(\frac{\partial I_r(x, y, z)}{\partial y}\right)^2 + \left(\frac{\partial I_r(x, y, z)}{\partial z}\right)^2}$$

is a magnitude of the 3D intensity gradients $$\frac{\partial I_r(x, y, z)}{\partial x}, \frac{\partial I_r(x, y, z)}{\partial y}, \frac{\partial I_r(x, y, z)}{\partial z}$$

of the reference image VOI $I_r$, and $$v_r(x, y, z) = \frac{1}{M_r(x, y, z)}\left[\frac{\partial I_r(x, y, z)}{\partial x}, \frac{\partial I_r(x, y, z)}{\partial y}, \frac{\partial I_r(x, y, z)}{\partial z}\right]^T$$

is a unit orientation vector of the gradient, and wherein the sum is over all points in the VOI.

6. The method of claim 5, further comprising restricting said sum to a subset of the VOI comprising those points whose intensity gradient magnitudes are above a threshold.

7. The method of claim 6, wherein the threshold is set to select about 15% of the points in the VOI.

8. The method of claim 1, wherein said current image search window is determined based on a location of the kidney in the reference image VOI and its maximum possible displacements.

9. A computer implemented method for registering digital renal perfusion images, the method performed by the computer comprising the steps of:
receiving a sequence of digital renal perfusion images;
selecting a volume of interest (VOI) containing a kidney in a reference renal perfusion image in said sequence of images;
building a template from 3D intensity gradients of a subset of points in said reference image VOI, wherein building the template comprises selecting those points in said VOI whose intensity gradient magnitudes are above a threshold, wherein each selected point is associated with its corresponding intensity gradient magnitude and intensity gradient orientation vector; and
calculating translational displacements at corresponding points in a current image in said sequence of images that maximize a similarity measure between the current image and the template.

10. The method of claim 9, further comprising computing 3D intensity gradients for a plurality of points in a search window of the current renal perfusion image.

11. The method of claim 10, wherein said similarity measure favors those current image gradients with large magnitudes and whose orientations are consistent with those of stronger edges in the reference VOI, and is invariant to rapidly changing image contrast.

12. The method of claim 11, wherein said similarity measure is defined as $$\tilde{S}(dx, dy, dz) = \sum_{(x,y,z)\in V_1} \tilde{w}\begin{pmatrix} x, y, z; \\ dx, dy, dz \end{pmatrix} \left| v_r(x, y, z)^T v_c\begin{pmatrix} x+dx, \\ y+dy, \\ z+dz \end{pmatrix} \right|.$$

wherein $\tilde{w}(x,y,z;dx,dy,dz)$ is defined by $$\tilde{w}(x, y, z; dx, dy, dz) = \frac{M_c(x+dx, y+dy, z+dz)}{\sum_{(x,y,z)\in V_1} M_c(x+dx, y+dy, z+dz)},$$

wherein $$M_r(x, y, z) = \sqrt{\left(\frac{\partial I_r(x, y, z)}{\partial x}\right)^2 + \left(\frac{\partial I_r(x, y, z)}{\partial y}\right)^2 + \left(\frac{\partial I_r(x, y, z)}{\partial z}\right)^2}$$

is a magnitude of the 3D intensity gradients $$\frac{\partial I_r(x, y, z)}{\partial x}, \frac{\partial I_r(x, y, z)}{\partial y}, \frac{\partial I_r(x, y, z)}{\partial z}$$

of the reference image VOI $I_r$, and $$v_r(x, y, z) = \frac{1}{M_r(x, y, z)}\left[\frac{\partial I_r(x, y, z)}{\partial x}, \frac{\partial I_r(x, y, z)}{\partial y}, \frac{\partial I_r(x, y, z)}{\partial z}\right]^T$$

is a unit orientation vector of the gradient, $V_1$ is the template, and wherein the sum is over all points in the $V_1$.

13. The method of claim 10, wherein maximizing said similarity measure between the reference image VOI and the current image search window comprises calculating said similarity measure for a plurality of translational displacements (dx,dy,dz) from points in said reference VOI template to points in said current image search window, and selecting a displacement (dx*,dy*,dz*) that maximizes the similarity measure.

14. A non-transitory program storage device readable by a computer, tangibly embodying a program of instructions executable by the computer to perform the method steps for registering digital renal perfusion images, the method comprising the steps of:
selecting a volume of interest (VOI) containing a kidney in a reference renal perfusion image;
computing 3D intensity gradients for a plurality of points in said VOI of said reference renal perfusion image;
computing 3D intensity gradients for a plurality of points in a search window of a current renal perfusion image, wherein said current image search window is determined based on a location of the kidney in the reference image VOI and its maximum possible displacements; and
maximizing a similarity measure between the reference image VOI and the current image search window, wherein said similarity measure is a function of said 3D intensity gradients computed for said reference image and said current image.

15. The computer readable program storage device of claim 14, wherein said volume of interest in said reference image is selected by two 2D bounding boxes in perpendicular planes.

16. The computer readable program storage device of claim 14, wherein registration is determined by translational displacement of the current image with respect to the reference image.

17. The computer readable program storage device of claim 16, wherein parameters associated with a maximal similarity measure determine the translational displacement of each point in the VOI of the reference image to a corresponding point in the current image.

18. The computer readable program storage device of claim 17, wherein maximizing the similarity measure between the reference image VOI and the current image search window comprises calculating said similarity measure for a plurality of translational displacements (dx,dy,dz) from points in said reference VOI to points in said current image search window, and selecting a displacement dx*,dy*,dz*) that maximizes the similarity measure.

19. The computer readable program storage device of claim 18, wherein said similarity measure is defined as $$S(dx, dy, dz) = \sum_{(x,y,z) \in V} w\begin{pmatrix} x, y, z; \\ dx, dy, dz \end{pmatrix} \left| v_r(x, y, z)^T v_c \begin{pmatrix} x+dx, \\ y+dy, \\ z+dz \end{pmatrix} \right|,$$

wherein w(x,y,z;dx,dy,dz) is defined by $$w(x, y, z; dx, dy, dz) = \frac{M_r(x, y, z) M_c(x+dx, y+dy, z+dz)}{\sum_{(x,y,z) \in V} M_r(x, y, z) M_c(x+dx, y+dy, z+dz)},$$

wherein $$M_r(x, y, z) = \sqrt{\left(\frac{\partial I_r(x, y, z)}{\partial x}\right)^2 + \left(\frac{\partial I_r(x, y, z)}{\partial y}\right)^2 + \left(\frac{\partial I_r(x, y, z)}{\partial z}\right)^2}$$

is a magnitude of the 3D intensity gradients $$\frac{\partial I_r(x, y, z)}{\partial x}, \frac{\partial I_r(x, y, z)}{\partial y}, \frac{\partial I_r(x, y, z)}{\partial z}$$

of the reference image VOI $I_r$, and $$v_r(x, y, z) = \frac{1}{M_r(x, y, z)} \left[\frac{\partial I_r(x, y, z)}{\partial x}, \frac{\partial I_r(x, y, z)}{\partial y}, \frac{\partial I_r(x, y, z)}{\partial z}\right]^T$$

is a unit orientation vector of the gradient, and wherein the sum is over all points in the VOI.

20. The computer readable program storage device of claim 19, the method further comprising restricting said sum to a subset of the VOI comprising those points whose intensity gradient magnitudes are above a threshold.

21. The computer readable program storage device of claim 20, wherein the threshold is set to select about 15% of the points in the VOI.

* * * * *